United States Patent Office 2,889,381
Patented June 2, 1959

2,889,381

MANUFACTURE OF ANTHRACENES

Gerald Scott and Francis Edward Gervase Tate, Manchester, England, assignors to Imperial Chemical Industries Limited, London, England, a corporation of Great Britain No Drawing. Application August 13, 1956
Serial No. 603,847

Claims priority, application Great Britain
August 22, 1955

8 Claims. (Cl. 260—670)

This invention relates to improvements in or relating to the manfacture of anthracenes.

In Bitish Patent No. 253,911 there is described a process for the manufacture of cyclic hydrocarbons from diaryl-methanes having a methyl group in an ortho-position to the methane carbon, by conducting the vapour of the diaryl methane mixed with oxygen or an agent yielding oxygen over a highly porous body at a raised temperature in the presence or absence of another catalytically acting substance.

We have now found that conversion of the starting materials and the yield of anthracenes may be increased and the formation of tar and by-products decreased by carrying out the cyclization in the absence of oxygen and in the presence of certain catalysts.

Thus according to our invention we provide an improvement in the process for the manufacture of anthracenes by cyclization of diarylmethanes containing a methyl group in a position ortho with respect to the methane carbon atom, characterised in that the said diaryl methanes are heated in the absence of oxygen, and in the presence of at least one metal of groups IB, II, III, IVA, VA, VIA, VIIA and VIII of the periodic table of the elements, or an oxide or sulphide thereof, as catalyst.

The catalyst may be in granular, lump or powder form, but preferably in the form of pellets. It may also, if desired, be deposited on an inert material for example carbon or pumice.

During the course of the reaction according to the process of our invention, the chemical form in which the metal is present may alter; thus a metal oxide or sulphide may be reduced to the metal itself.

As catalysts there may be used, for example, magnesium oxide, zinc oxide, alumina, zirconia, manganese oxide, zinc oxide on alumina, vanadium oxide on pumice, chromia on alumina, molybdena on alumina, ferric oxide on alumina, cobalt oxide on alumina, nickel oxide on alumina, silver on alumina, platinum on alumina, palladium on carbon, but there are to be preferred the oxides of zinc, chromium, iron and cobalt supported on alumina.

Small amounts of the oxides of the group IA metals, may be included if desired, in order to reduce side reactions.

The diarylmethanes which may be used in the process of the invention may contain further substituents in the aryl radicals for example alkyl, cycloalkyl, aralkyl, alkenyl and aryl radicals and may also bear further substituents on the methane carbon atom for example alkyl radicals. As diaryl methanes which may be used there may be mentioned ortho-benzyltoluene, 2:4-dimethyldiphenylmethane, 2:5-dimethyldiphenylmethane, α-phenyl-α-(2-methylphenyl)-ethane, α-phenyl-α-(2:4-dimethylphenyl)-ethane, 2:4-dibenzyltoluene, 2-methyl-4-tert.-butyldiphenylmethane, 2:4'-dimethyldiphenylmethane, 2:4:6-trimethyldiphenylmethane, 2:5:4'-trimethyldiphenylmethane and 1-benzyl-2-methylnaphthalene, 1-(2'-naphthylmethyl)-2-methylnaphthalene.

The diarylmethanes may be heated for example at a temperature above 350° C. and preferably at a temperature between 400° C. and 550° C. Conveniently the vapours of the diarylmethane are passed continuously through a heated chamber or tube, which contains the catalysts in convenient form. In this embodiment of the invention, the time of heating may be controled by adjustment of the rate of flow of vapour in relation to the dimensions of the part of the apparatus containing the catalyst. The time of heating may be up to 100 seconds, but conveniently is between 1 and 50 seconds. Heating may be carried out at atmospheric pressure, or at pressures other than atmospheric if so desired.

The chamber or tube containing the catalyst may be made of any material which is not adversely affected by the temperature used, and which does not promote any undesirable side reactions; as suitable materials there may be mentioned heat resistant glass, silica, porcelain and iron.

There may also be present inert diluents, which may be any vapour which does not promote the formation of undesirable by-products, and may be for example carbon dioxide, hydrogen or nitrogen, water vapour, or a hydrocarbon vapour for example toluene or diarylmethanes without a methyl or methylene group in a position ortho to the methane carbon atom, as may be formed as by-products in the formation of the reactant.

During the heating according to the process of the invention, there may occur some decomposition of the anthracene formed whereby less substituted anthracenes are formed. This decomposition can be increased, if desired, by increased heating, or by heating in the presence of catalyst useful for the "cracking" of hydrocarbons, as is more fully described in copending U.S. application Serial No. 603,846 now abandoned.

The invention is illustrated but not limited by the following examples in which the parts and percentages are by weight, and the liquid hourly space velocity is defined as being the ratio of the volume of liquid feed per hour to the bulk volume of the catalyst.

Example 1

A catalyst is made by impregnating ⅛ inch diameter alumina pellets with a solution of ferric nitrate followed by calcination so that the final solid contains 10% of ferric oxide, and then heating these pellets in a stream of hydrogen at 500° C. for 6 hours. Ortho-benzyltoluene is vapourised by heating and the vapour is mixed with three times its volume of nitrogen and the mixture is passed through a heat resistant glass tube, which contains the catalyst described above and is heated to a temperature between 450° C. and 460° C. The rate of flow of the gaseous mixture is adjusted so that the liquid hourly space velocity is 0.5. The gases issuing from the tube are cooled by means of an efficient water condenser to remove therefrom the lower boiling aromatic hydrocarbons. Light yellow crystals separate from the cold condensate, and these are removed by filtration, washed twice with methyl alcohol, and dried. This solid product is anthracene, melting at 212–214° C. The yield per pass is 29%, and the liquid remaining after removal of the crystals by filtration contains 95% o-benzyltoluene and 4% anthracene. The yield is 78% of the theoretical, based on o-benzyltoluene consumed. A further quantity of the material is obtained as a residue by evaporating the wash liquors.

Example 2

100 parts of benzyltoluene (containing the isomers in the approximate proportions of ortho, 46%; meta, 3%; para, 51%) are passed through a heat resistant glass tube, containing a catalyst consisting of ⅛" diameter pellets having the composition $Cr_2O_3$ 43%, $Al_2O_3$ 54%, CaO 2% and $K_2O$ 1%, and heated at 400° C., at such a rate that the liquid hourly space velocity is 0.5. The vapors issuing from the tube are condensed, whereby 90 parts of a partially solid condensate are obtained, which are separated by filtration into 20 parts of anthracene and 70 parts of benzyltoluene which contains the isomers in the approximate proportions of ortho, 38%; meta, 6%; para, 55%. The yield of anthracene corresponds to almost 100% of theoretical based on the ortho-benzyltoluene consumed.

Example 3

2:5-dimethyldiphenylmethane is passed through a heat resistant glass tube which contains a catalyst, made by co-precipitating zinc oxide with alumina in the proportions 1:9 by weight, shaped into ⅛ inch diameter pellets and heated at 455° C., at such a rate that the liquid hourly space velocity is 0.8. The vapors issuing from the tube are condensed, and the yield of β-methylanthracene (M.P. 203-5° C.), obtained by filtration of the condensate and washing the solid with methanol, is 18% of theory. The unconverted 2:5-dimethyldiphenylmethane can be recycled without further treatment to give an overall yield of 90% of theoretical of β-methylanthracene based on the 2:5-dimethyldiphenylmethane consumed.

Example 4

A catalyst is made by impregnating ⅛ inch diameter alumina pellets with a solution of cobalt nitrate followed by calcination so that the final solid contains 10% of cobalt oxide, and then heating the pellets in hydrogen at 500° C. 2:5-dimethyldiphenylmethane is vaporized by heating and the vapor is passed through a heat resistant glass tube which contains the catalyst described above and is heated at 475° C. The rate of flow of the vapor is adjusted so that the liquid hourly space velocity is 0.4. The vapors issuing from the tube are passed through an efficient water condenser, and the condensate is cooled and filtered. The solid, consisting of β-methylanthracene, is washed with methanol and dried. The yield is 35.1% by weight of the benzyl-p-xylene employed and the overall yield is 77.7% of theoretical based on 2:5-dimethyldiphenylmethane consumed.

Example 5

A catalyst is made by forming into ⅛ inch diameter pellets a composition consisting of $Cr_2O_3$ 12%, $Al_2O_3$ 86%, MgO 2% and then heating these pellets in a stream of hydrogen at 500° C. for 8 hours. 100 parts of 2:5-dimethyldiphenylmethane are vaporized by heating and the vapor passed through the catalyst, made as described above and maintained at 428-430° C. at such a rate that the liquid hourly space velocity is 0.5. The vapor is then cooled and the condensate, which comprises 94 parts of a light yellow partially crystalline product, is filtered. The solid portion comprises 27.1 parts of β-methylanthracene. The yield based on 2:5-dimethyldiphenylmethane consumed is 90.3%.

Example 6

A catalyst is made by forming into ⅛ inch diameter pellets a composition which comprises $Cr_2O_3$, 43%; $Al_2O_3$, 54%; CaO, 2%; $K_2O$, 1%, and then heating the pellets in a stream of hydrogen at 500° C. for 8 hours. 100 parts of 2:4-dibenzyltoluene are vaporized by heating, and the vapor passed through a catalyst, prepared as described above and maintained at 450° C., at such a rate that the liquid hourly space velocity is 0.6. The vapor is then cooled and the condensate, which comprises 81 parts of a partially solid product, is distliled at a pressure of 12 mm. of mercury. Three main fractions are thus obtained; the first comprises 20.5 parts, boils at 230–235° C. and consists mainly of anthracene, the second boils at 240–250° C. and consists of 35 parts of unchanged dibenzyltoluene, and the third boils at 280–290° C. and consists of 14 parts of solid 2-benzylanthracene (M.P. 137.5° C.) and 7 parts of liquid dibenzyl toluene, which may be separated by filtration. The yields, calculated as percent of theoretical based on dibenzyltoluene consumed, are thus: Anthracene, 56%; 2-benzylanthracene, 24%.

Example 7

A mixture of 90 parts of 2-benzyl-4-tert.-butyltoluene and 10 parts of 2-benzyl-5-t-butyltoluene is vaporized by heating and the vapor passed through a catalyst prepared as described in Example 5 and maintained at a temperature of 450° C. at such a rate that the liquid hourly space velocity is 0.3. The vapor is then cooled and the condensate is distilled at a pressure of 8 mm. of mercury. Two main fractions are thus obtained; the first boils at 155–160° C. and consists of 62 parts of unchanged benzylbutyltoluene, and the second boils at 185–205° C. and consists mainly of 27.5 parts of 2-tert.-butylanthracene, M.P. 146° C. Some anthracene is present in the 2-tert.-butylanthracene fraction. The yield of anthracene is thus 80–85% of the theoretical based on benzyl-tert.-butyltoluene consumed.

What we claim is:

1. Process for the manufacture of anthracenes by cyclization of diarylmethanes containing a methyl group in a position ortho with respect to the methane carbon atom, characterised in that the said diaryl methanes are heated in the absence of free oxygen, and in the presence of at least one member of the class consisting of the metals of groups IB, II, III, IVA, VA, VIA, VIIA and VIII of the Periodic Table of the elements, and oxides and sulfides thereof, as catalyst, said oxides being non-reducible under the conditions of the cyclisation whereby said cyclization is effectively carried out in the absence of free oxygen.

2. Process for the manufacture of anthracenes, as claimed in claim 1 wherein the catalyst is in the form of pellets.

3. Process for the manufacture of anthracenes as claimed in claim 1 wherein the catalyst is selected from the group consisting of the oxides of zinc, chromium, iron and cobalt, supported on alumina.

4. Process for the manufacture of anthracenes as claimed in claim 1 wherein the diarylmethanes are heated at a temperature above 350° C.

5. Process for the manufacture of anthracenes as claimed in claim 4 wherein the diarylmethanes are heated at a temperature between 400° C. and 550° C.

6. Process for the manufacture of anthracenes as claimed in claim 1 wherein the diarylmethane is selected from the group consisting of ortho-benzyltoluene, 2:4-dimethyldiphenylmethane, 2:5-dimethyldiphenylmethane, α-phenyl-α-(2-methylphenyl)-ethane, α-phenyl-α-(2:4-dimethylphenyl)-ethane, 2:4-dibenzyltoluene, 2-methyl-4-tert. - butyldiphenylmethane, 2:4' - dimethyldiphenylmethane, 2:4:6 - trimethyldiphenylmethane, 2:5:4' - tri - methyldiphenylmethane, 1-benzyl-2-methyl-naphthalene and 1-(2'-naphthylmethyl)-2-methylnaphthalene.

7. Process for the manufacture of anthracenes as claimed in claim 1 wherein the diarylmethane is heated at a temperature between 400° C. and 550° C. for up to 100 seconds.

8. Process for the manufacture of anthracenes as claimed in claim 1 wherein the catalyst includes an oxide of a group IA metal.

References Cited in the file of this patent

UNITED STATES PATENTS

| | | |
|---|---|---|
| 1,776,924 | Nicodemus et al. | Sept. 30, 1930 |
| 2,414,118 | Orchin | Jan. 14, 1947 |

FOREIGN PATENTS

| | | |
|---|---|---|
| 253,911 | Great Britain | June 15, 1926 |